(12) United States Patent
Foret

(10) Patent No.: US 9,156,715 B2
(45) Date of Patent: *Oct. 13, 2015

(54) APPARATUS FOR TREATING LIQUIDS WITH WAVE ENERGY FROM AN ELECTRICAL ARC

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,087

(22) Filed: Dec. 23, 2013

(65) Prior Publication Data

US 2014/0110326 A1    Apr. 24, 2014

Related U.S. Application Data

(60) Continuation of application No. 13/687,001, filed on Nov. 28, 2012, now Pat. No. 8,641,898, which is a continuation of application No. 13/337,950, filed on Dec. 27, 2011, now Pat. No. 8,343,342, which is a (Continued)

(51) Int. Cl.
*C02F 1/48* (2006.01)
*A23B 4/015* (2006.01)

(Continued)

(52) U.S. Cl.
CPC . *C02F 1/48* (2013.01); *A23B 4/015* (2013.01); *A23L 2/50* (2013.01); *A23L 3/26* (2013.01);

(Continued)

(58) Field of Classification Search
CPC .......... C02F 1/48; C02F 1/4608; C02F 1/006; C02F 1/32; C02F 1/36; C02F 1/46109; C02F 1/30; C02F 1/302; C02F 1/467; C02F 2001/008; C02F 2103/16; C02F 2103/22; C02F 2301/026; C02F 2305/023; C02F 2305/10

USPC ............. 210/198.1, 243, 512.1; 250/436, 438

See application file for complete search history.

(56) References Cited

U.S. PATENT DOCUMENTS

| 1,698,096 A | 1/1929 | Hirschfeld |
|---|---|---|
| 1,727,361 A | 9/1929 | Ashcraft |

(Continued)

FOREIGN PATENT DOCUMENTS

| CA | 2304938 A1 | 2/2001 |
|---|---|---|
| EP | 237216 A1 | 9/1987 |

(Continued)

OTHER PUBLICATIONS

Extended European Search Report 08840081 dated May 21, 2014.

(Continued)

*Primary Examiner* — Matthew O Savage
(74) *Attorney, Agent, or Firm* — Daniel J. Chalker; Edwin S. Flores; Chalker Flores, LLP

(57) ABSTRACT

An apparatus for treating a liquid includes: (a) a pump volute or hydrocyclone head having an inlet and a throat having an outlet and a central axis, (b) a tank connected to the outlet of the throat, the tank has a maximum inner diameter that is larger than an inner diameter of the outlet of the throat, and (c) a wave energy source having a first electrode within the pump volute or hydrocyclone head that extends through the outlet of the throat along the central axis, and a second electrode within the tank that is spaced apart and axially aligned with first electrode along the central axis. The liquid is supplied to the inlet of the pump volute or hydrocyclone head, and is irradiated with one or more wave energies produced by the wave energy source.

61 Claims, 7 Drawing Sheets

Related U.S. Application Data continuation of application No. 12/949,745, filed on Nov. 18, 2010, now Pat. No. 8,110,100, which is a division of application No. 11/784,326, filed on Apr. 5, 2007, now Pat. No. 7,857,972, which is a continuation-in-part of application No. 10/935,786, filed on Sep. 7, 2004, now Pat. No. 7,422,695.

(60) Provisional application No. 60/500,445, filed on Sep. 5, 2003, provisional application No. 60/789,670, filed on Apr. 5, 2006.

(51) Int. Cl.

| | |
|---|---|
| *A23L 2/50* | (2006.01) |
| *A23L 3/26* | (2006.01) |
| *B01J 19/00* | (2006.01) |
| *B01J 19/08* | (2006.01) |
| *B01J 19/12* | (2006.01) |
| *B01J 19/24* | (2006.01) |
| *C02F 1/00* | (2006.01) |
| *C02F 1/32* | (2006.01) |
| *C02F 1/36* | (2006.01) |
| *C02F 1/46* | (2006.01) |
| *C02F 1/461* | (2006.01) |
| *H05B 11/00* | (2006.01) |
| *C02F 1/30* | (2006.01) |
| *C02F 1/467* | (2006.01) |
| *C02F 103/00* | (2006.01) |
| *C02F 103/16* | (2006.01) |
| *C02F 103/22* | (2006.01) |

(52) U.S. Cl.
CPC ............ *B01J 19/008* (2013.01); *B01J 19/08* (2013.01); *B01J 19/088* (2013.01); *B01J 19/123* (2013.01); *B01J 19/128* (2013.01); *B01J 19/2405* (2013.01); *B01J 19/247* (2013.01); *C02F 1/006* (2013.01); *C02F 1/30* (2013.01); *C02F 1/302* (2013.01); *C02F 1/32* (2013.01); *C02F 1/36* (2013.01); *C02F 1/467* (2013.01); *C02F 1/4608* (2013.01); *C02F 1/46109* (2013.01); *H05B 11/00* (2013.01); *B01J 2219/083* (2013.01); *B01J 2219/0809* (2013.01); *B01J 2219/0839* (2013.01); *B01J 2219/0869* (2013.01); *B01J 2219/0877* (2013.01); *B01J 2219/0884* (2013.01); *B01J 2219/185* (2013.01); *B01J 2219/1946* (2013.01); *C02F 2001/46133* (2013.01); *C02F 2103/008* (2013.01); *C02F 2103/16* (2013.01); *C02F 2103/22* (2013.01); *C02F 2301/024* (2013.01); *C02F 2301/026* (2013.01); *C02F 2305/023* (2013.01); *C02F 2305/10* (2013.01); *Y02W 10/37* (2013.01)

(56) References Cited

U.S. PATENT DOCUMENTS

| | | |
|---|---|---|
| 2,139,657 A | 12/1938 | Baeckler |
| 2,260,823 A | 3/1940 | Bettis |
| 2,705,219 A | 3/1955 | Heiskell et al. |
| 3,201,337 A | 8/1965 | Eichelberger et al. |
| 3,242,305 A | 3/1966 | Kane et al. |
| 3,254,770 A | 6/1966 | Herndon |
| 3,292,028 A | 12/1966 | Van Ornum |
| 3,324,334 A | 6/1967 | Reed |
| 3,428,125 A | 2/1969 | Parker |
| 3,567,921 A | 3/1971 | Holiday |
| 3,769,517 A | 10/1973 | Coleman |
| 3,772,172 A | 11/1973 | Zhagatspanian et al. |
| 3,826,920 A | 7/1974 | Woodroffe et al. |
| 3,917,479 A | 11/1975 | Sayce et al. |
| 3,924,246 A | 12/1975 | Scherer |
| 3,958,636 A | 5/1976 | Perkins |
| 3,998,477 A | 12/1976 | Delahaye et al. |
| 4,002,918 A | 1/1977 | Graentzel |
| 4,018,973 A | 4/1977 | Paton et al. |
| 4,279,743 A | 7/1981 | Miller |
| 4,296,066 A | 10/1981 | Schenck |
| 4,317,041 A | 2/1982 | Schenck |
| 4,344,483 A | 8/1982 | Fisher et al. |
| 4,381,978 A | 5/1983 | Gratzel et al. |
| 4,382,469 A | 5/1983 | Bell et al. |
| 4,397,823 A | 8/1983 | Dimpfl |
| 4,427,636 A | 1/1984 | Obenshain |
| 4,448,935 A | 5/1984 | Iovine et al. |
| 4,454,835 A | 6/1984 | Walsh et al. |
| 4,476,105 A | 10/1984 | Greenbaum |
| 4,477,283 A | 10/1984 | Wilson, Sr. |
| 4,488,935 A | 12/1984 | Ruhe |
| 4,508,040 A | 4/1985 | Santen et al. |
| 4,530,101 A | 7/1985 | Fey et al. |
| 4,544,470 A | 10/1985 | Hetrick |
| 4,554,435 A | 11/1985 | Wolf et al. |
| 4,622,115 A | 11/1986 | O'Neill |
| 4,626,648 A | 12/1986 | Browning |
| 4,670,048 A | 6/1987 | Pineau |
| 4,761,793 A | 8/1988 | Digne et al. |
| 4,774,026 A | 9/1988 | Kitamori et al. |
| 4,803,365 A | 2/1989 | Krause et al. |
| 4,863,608 A | 9/1989 | Kawai et al. |
| 4,868,127 A | 9/1989 | Blades et al. |
| 4,948,980 A | 8/1990 | Wedekamp |
| 4,957,773 A | 9/1990 | Spencer et al. |
| 4,998,486 A | 3/1991 | Dighe et al. |
| 5,015,432 A | 5/1991 | Koloc |
| 5,019,256 A | 5/1991 | Ifill et al. |
| 5,045,288 A | 9/1991 | Raupp et al. |
| 5,094,815 A | 3/1992 | Conboy et al. |
| 5,120,450 A | 6/1992 | Stanley, Jr. |
| 5,124,131 A | 6/1992 | Wekhof |
| 5,126,111 A | 6/1992 | Al-Ekabi et al. |
| 5,149,377 A | 9/1992 | Esrom et al. |
| 5,166,950 A | 11/1992 | Jouvaud et al. |
| 5,200,156 A | 4/1993 | Wedekamp |
| 5,227,053 A | 7/1993 | Brym |
| 5,243,169 A | 9/1993 | Tateno et al. |
| 5,403,399 A | 4/1995 | Kurihara et al. |
| 5,413,768 A | 5/1995 | Stanley, Jr. |
| 5,439,595 A | 8/1995 | Downey, Jr. |
| 5,439,652 A | 8/1995 | Sczechowski et al. |
| 5,451,738 A | 9/1995 | Alvi et al. |
| 5,472,567 A | 12/1995 | Torregrossa |
| 5,529,701 A | 6/1996 | Grisham et al. |
| 5,531,904 A | 7/1996 | Grisham et al. |
| 5,611,896 A | 3/1997 | Swanepoel et al. |
| 5,637,127 A | 6/1997 | McLaughlin et al. |
| 5,662,811 A | 9/1997 | Grisham et al. |
| 5,664,733 A | 9/1997 | Lott |
| 5,680,014 A | 10/1997 | Miyamoto et al. |
| 5,696,380 A | 12/1997 | Cooke et al. |
| 5,730,875 A | 3/1998 | Grisham et al. |
| 5,738,281 A | 4/1998 | Zurecki et al. |
| 5,832,361 A | 11/1998 | Foret |
| 5,843,211 A | 12/1998 | Bielefeldt |
| 5,866,910 A | 2/1999 | Cooke et al. |
| 5,994,705 A | 11/1999 | Cooke et al. |
| 6,004,386 A | 12/1999 | Grisham et al. |
| 6,019,947 A | 2/2000 | Kucherov |
| 6,054,097 A | 4/2000 | Mass et al. |
| 6,090,296 A | 7/2000 | Oster |
| 6,117,401 A | 9/2000 | Juvan |
| 6,182,585 B1 | 2/2001 | Gonopolsky et al. |
| 6,187,206 B1 | 2/2001 | Bernier et al. |
| 6,228,266 B1 | 5/2001 | Shim |
| 6,355,178 B1 | 3/2002 | Couture et al. |
| 6,362,449 B1 | 3/2002 | Hadidi et al. |
| 6,377,602 B1 | 4/2002 | Aita et al. |
| 6,410,880 B1 | 6/2002 | Putvinski et al. |

(56) References Cited

U.S. PATENT DOCUMENTS

| | | |
|---|---|---|
| 6,565,803 B1 | 5/2003 | Bolton et al. |
| 6,630,113 B1 | 10/2003 | Surma |
| 6,693,253 B2 | 2/2004 | Boulos et al. |
| 6,713,771 B2 | 3/2004 | Nakagawa et al. |
| 6,987,792 B2 | 1/2006 | Do et al. |
| 7,422,695 B2 | 9/2008 | Foret |
| 7,578,937 B2 | 8/2009 | Foret |
| 7,622,693 B2 | 11/2009 | Foret |
| 7,857,972 B2 | 12/2010 | Foret |
| 7,882,646 B2 | 2/2011 | Gorbell et al. |
| 7,897,053 B2 | 3/2011 | Foret |
| 7,905,942 B1 | 3/2011 | Layman |
| 7,985,342 B2 | 7/2011 | Foret |
| 8,002,992 B2 | 8/2011 | Foret |
| 8,088,290 B2 | 1/2012 | Foret |
| 8,110,100 B2 | 2/2012 | Foret |
| 8,263,897 B2 | 9/2012 | Morrisroe |
| 8,324,523 B2 | 12/2012 | Foret |
| 8,329,044 B2 | 12/2012 | Foret |
| 8,337,709 B2 | 12/2012 | Foret |
| 8,338,709 B2 | 12/2012 | Kodama et al. |
| 8,343,342 B2 * | 1/2013 | Foret ........................ 210/198.1 |
| 8,357,873 B2 | 1/2013 | Foret |
| 8,366,925 B2 | 2/2013 | Foret |
| 8,591,523 B2 | 11/2013 | Weber |
| 8,597,523 B2 | 12/2013 | Foret |
| 8,641,898 B2 * | 2/2014 | Foret ........................ 210/198.1 |
| 2001/0046964 A1 | 11/2001 | Percel et al. |
| 2001/0047964 A1 | 12/2001 | Matherly et al. |
| 2003/0150325 A1 | 8/2003 | Hyppanen |
| 2004/0020188 A1 | 2/2004 | Kramer et al. |
| 2005/0013772 A1 | 1/2005 | Patton et al. |
| 2006/0104849 A1 | 5/2006 | Tada |
| 2006/0163054 A1 | 7/2006 | Spitzl et al. |
| 2006/0252974 A1 | 11/2006 | McVey et al. |
| 2007/0102152 A1 | 5/2007 | Forgeron |
| 2007/0253874 A1 | 11/2007 | Foret |
| 2008/0058228 A1 | 3/2008 | Wilson |
| 2009/0277774 A1 | 11/2009 | Foret |
| 2010/0212498 A1 | 8/2010 | Salazar |
| 2012/0097648 A1 | 4/2012 | Foret |
| 2012/0227968 A1 | 9/2012 | Eldred et al. |

FOREIGN PATENT DOCUMENTS

| | | |
|---|---|---|
| KR | 10-2004-0005107 | 1/2004 |
| RU | 2102587 C1 | 1/1998 |
| WO | 94/16809 | 8/1994 |
| WO | 99/04607 | 1/1999 |

OTHER PUBLICATIONS

International Search Report and Written Opinion for PCT/US2007/008529 dated Jun. 11, 2008.
International Search Report and Written Opinion for PCT/US2009/033979 dated Sep. 15, 2009.
Lectures: On Illuminating Engineering Delivered at The John Hopkins University, Published 1911 Johns Hopkins Press, p. 140.
European Search Report 07755050.7 dated Dec. 29, 2011.
BLRBAC: "Recommended Good Practice for the Thermal Oxidation of Waste Streams in a Black Liquor Recovery Boiler." Published Oct. 6, 1999.
NISTIR 6341 "Simulating Fire Whirls", Feb. 2000.
NISTIR 6427 "The Fluid Dynamics of Whirls—An Inviscid Model", Feb. 2000.
PCT/US2014/2014/024991 [KIPO] International Search Report dated Aug. 6, 2014.
PCT/US2013/074506 [KIPO] International Search Report dated Mar. 18, 2014.

* cited by examiner

APPARATUS FOR TREATING LIQUIDS WITH WAVE ENERGY FROM AN ELECTRICAL ARC

PRIORITY CLAIM AND CROSS-REFERENCE TO RELATED APPLICATIONS

This patent application is a continuation application of U.S. patent application Ser. No. 13/687,001 filed on Nov. 28, 2012 and entitled "Apparatus for Treating Fluids with Wave Energy from an Electrical Arc", now U.S. Pat. No. 8,641,898, which is a continuation application of U.S. patent application Ser. No. 13/337,950 filed on Dec. 27, 2011 and entitled "Apparatus for Treating Fluids with Wave Energy from an Electrical Arc", now U.S. Pat. No. 8,343,342, which is a continuation application of U.S. patent application Ser. No. 12/949,745 filed on Nov. 18, 2010 and entitled "System for Treating Fluids with Wave Energy from an Electrical Arc", now U.S. Pat. No. 8,110,100, which is a divisional application of U.S. patent application Ser. No. 11/784,326 filed on Apr. 5, 2007 and entitled "System, Method and Apparatus for Treating Fluids with Wave Energy from an Electrical Arc", now U.S. Pat. No. 7,857,972, which is: (a) a continuation-in-part application of U.S. patent application Ser. No. 10/935,786 filed on Sep. 7, 2004 and entitled "Treatment of Fluids with Wave Energy from a Carbon Arc", now U.S. Pat. No. 7,422,695, which is a non-provisional application of U.S. provisional patent application 60/500,445 filed on Sep. 5, 2003; (b) a non-provisional application of U.S. provisional patent application 60/789,670 filed on Apr. 5, 2006 and entitled "System, Method and Apparatus for Treating Liquids with Wave Energy from an Electrical Arc". All of the foregoing applications are hereby incorporated by reference in their entirety.

This patent application is related to: (a) U.S. patent application Ser. No. 11/784,327 filed on Apr. 5, 2007 and entitled "System, Method and Apparatus for Treating Liquids with Wave Energy from Plasma"; (b) U.S. patent application Ser. No. 13/186,563 filed on Jul. 20, 2011 and entitled "Method for Treating a Substance with Wave Energy from an Electrical Arc and a Second Source"; (c) U.S. patent application Ser. No. 13/186,772 filed on Jul. 20, 2011 and entitled "System for Treating a Substance with Wave Energy from an Electrical Arc and a Second Source"; (d) U.S. patent application Ser. No. 13/186,755 filed on Jul. 20, 2011 and entitled "Apparatus for Treating a Substance with Wave Energy from an Electrical Arc and a Second Source"; (e) U.S. patent application Ser. No. 13/215,207 filed on Aug. 22, 2011 and entitled "Method for Treating a Substance with Wave Energy from Plasma and an Electrical Arc"; (f) U.S. patent application Ser. No. 13/215,223 filed on Aug. 22, 2011 and entitled "Apparatus for Treating a Substance with Wave Energy from Plasma and an Electrical Arc"; (g) U.S. Pat. No. 8,597,523; (h) U.S. Pat. No. 8,366,925; (i) U.S. Pat. No. 8,357,873; (j) U.S. Pat. No. 8,337,709; (k) U.S. Pat. No. 8,329,044; (l) U.S. Pat. No. 8,324,523; (m) U.S. Pat. No. 8,110,100; (n) U.S. Pat. No. 8,088,290; (o) U.S. Pat. No. 8,002,992; (p) U.S. Pat. No. 7,985,342; (q) U.S. Pat. No. 7,897,053; (r) U.S. Pat. No. 7,857,972; (s) U.S. Pat. No. 7,622,693; (t) U.S. Pat. No. 7,578,937; and (u) U.S. Pat. No. 7,422,695.

FIELD OF THE INVENTION

The present invention relates generally to the field of treating liquids, and more particularly, to an apparatus for treating liquids with wave energy produced from an electrical arc.

BACKGROUND OF THE INVENTION

Without limiting the scope of the invention, its background is described in connection with treating liquids in particular drinking water, wastewater, beverages, juices, milk, emulsions, ballast water, bilge water, cooling tower water, process water, mill water, raw sewage, crude oil, hydrocarbon streams, black liquor and any pumpable liquid, as an example. During the past decade the need for alternatives to chlorination of drinking water and wastewater effluent has increased in dramatic fashion. This is primarily due to emerging pathogenic microorganisms that are resistant to many oxidants such as chlorine, as well as the problems associated with the byproducts formed by reacting chlorine with organics found in drinking water sources.

For example, many drinking water sources contain organic matter. When the organic matter is chlorinated the byproducts are a group of compounds referred to as trihalomethanes (THMs), some of which cause cancer. Consequently, this has led the US EPA to promulgate new disinfection regulations regarding both pathogenic microorganisms and the formation of THMs. Currently, there is an unmet demand for a simple and cost-effective alternative to supplement chlorination that can also be used for treating other water streams. For example, one such alternative disinfection system is the use of ultraviolet (UV) radiation to augment chlorination. Likewise, UV radiation can replace chlorination chambers in wastewater treatment plants, since the effluent must be dechlorinated which requires an additional chemical such as sulfur dioxide. Two other large volume streams that can be treated with UV radiation are ballast water from ships and combined sewer overflows (CSO).

Heretofore water treatment systems that incorporate UV radiation have been constructed of a lamp housed within a quartz sleeve. Examples of prior UV radiation systems include low pressure or medium pressure mercury arc lamps. One of the main problems with existing UV radiation systems that incorporate mercury arc lamps is that they fail to maximize the use of electricity. More particularly, by utilizing only the energy in the form of UV radiation converted from the electricity used in the overall electrical circuit—the lamp—is inefficient and requires higher doses of UV radiation than are necessary if more of the electrical energy in the electrical circuit could be utilized for pathogen inactivation or treatment of pollutants. For example, a typical UV lamp may convert only 30% to 40% of the electricity used in the lamp into UV radiation. In addition, these lamps contain mercury, which is a pollutant that can be transferred via the food chain.

In addition, any UV radiation system incorporating a "bulb" is prone to burn out. Furthermore, over time the glass or quartz envelope and the bulb become solarized due to the UV light. In addition, over time the quartz envelope that houses the lamp becomes dirty. The quartz tube must be removed and cleaned manually if it does not include a wiper system for in-situ cleaning of the tube. Consequently, the effectiveness of the UV radiation system to inactivate cryptosporidium is reduced over time as the lamp ages and the quartz sleeve or envelope becomes dirty.

Moreover, there is an emerging pathogen of concern, mycobacteria, that is resistant to chlorine and many biocides. Likewise, mycobacteria inactivation requires a higher dose of UV light than either Cryptosporidium and Giardi. In addition, low doses of UV light cannot be applied to meet sterilization or pasteurization guidelines as set forth by the US FDA, USDA and UPH. The terms disinfection and sterilization are clearly defined and differentiated by several regulator agencies.

Accordingly, there is a need for a wave energy water treatment system that is compact and portable, yet does not use mercury. In addition, there is a need for a wave energy water treatment system that is energy efficient, rugged, low maintenance and compact. Likewise, there is a need for a wave energy system that can also remove fine sediment or reduce turbidity in water. In addition, there is a need for a disinfection system that can also phase separate material of various densities from that of water, such as oil and grease, wood, leaves, and plastic bottles from water. Furthermore, there is a need for reducing organic matter in water.

SUMMARY OF THE INVENTION

The present invention provides an apparatus for treating liquids with wave energy from an electrical arc that: (1) is compact and portable, yet does not use mercury; (2) is energy efficient, rugged, low maintenance and compact; (3) can also remove fine sediment or reduce turbidity in water; (4) can also phase separate material of various densities from that of water, such as oil and grease, wood, leaves, and plastic bottles from water; and/or (5) can reduce organic matter in water. The liquid can be drinking water, wastewater, beverages, juices, milk, emulsions, ballast water, bilge water, cooling tower water, process water, mill water, raw sewage, crude oil, hydrocarbon streams, black liquor or any pumpable liquid. The present invention can operate in remote areas of the world that can deliver various forms of wave energy to the water and contaminants, and not simply UV radiation that would aid in decomposing organics and producing a potable water source, which is needed immediately throughout the world. In addition, the present invention can be operated without line power by using a wind turbine or photovoltaic cells, which allows for remote treatment of water and wastewater without the need of a generator or line power.

The present invention generates a whirlpool or cyclonic flow and one or more wave energies in the "eye" "plasma core" or "hollow gas core" of the whirlpool. The present invention treats the liquids or fluids by first irradiating the fluid with a plasma arc centrally located within the gas core of the whirling fluid, then second forming a thin film with the fluid and irradiating the thin film fluid and third reflecting the wave energy in order to increase the dose of wave energy absorbed by the fluid or matter within the fluid. The present invention can also provide an advanced oxidation/reduction process (AORP) for treating fluids utilizing a semi-conductor catalyst. Likewise, the present invention includes a means for introducing charged nano metals and minerals as well as carbon for treating water. Additionally, the present invention includes a phase separation mechanism.

The present invention, which will be described in detail below, provides superior wave energy delivery to the fluid to be treated, a superior method for stripping and destroying volatiles in-situ and a method for subjecting fluids, contaminants and pathogens to several forms of wave energy simultaneously. In addition, the present invention provides a mechanism for treating matter with several forms of wave energy, such as ultraviolet radiation, vacuum ultraviolet radiation, infrared radiation, visible light radiation, sonic energy, ultrasonic energy, electrolysis or a combination thereof. Additionally, the present invention provides a mechanism for generating an oxidant or free radicals in-situ. Furthermore, the present invention utilizes a unique approach for disinfecting and filtering water within the same system. Hence, by the present invention's novel wave energy method for treating fluids by eliminating the lamp, and using a carbon arc in combination with a whirling fluid, a system can be designed to treat very low flow rates using a wind turbine or photovoltaic cells to recharge DC batteries, while scaling up to treat volumes of water currently unheard of by using very large DC power supplies and graphite rods, commonly found within the foundry industry—carbon arc furnaces.

Accordingly, the present invention treats liquids or fluids with several forms of wave energy at wavelengths, focus, intensity and residence times that is superior to prior methods. The present invention uses the conservation of angular momentum to first form a whirling fluid that increases in velocity, then expands outwardly to form a thin film upside down whirlpool or funnel, generally shaped in the form of an umbrella or parabolic reflector. The present invention also overcomes residence time and absorbance phenomena associated with photochemical reactions.

More specifically, the present invention provides an apparatus for treating a liquid that includes: (a) a pump volute or hydrocyclone head having an inlet and a throat having an outlet and a central axis; (b) a tank connected to the outlet of the throat, the tank has a maximum inner diameter that is larger than an inner diameter of the outlet of the throat; and (d) a wave energy source having a first electrode within the pump volute or hydrocyclone head that is aligned with the central axis, and a second electrode within the tank that is spaced apart and axially aligned with first electrode along the central axis. The liquid is supplied to the inlet of the pump volute or hydrocyclone head, and is irradiated with one or more wave energies produced by the wave energy source.

In addition, the present invention provides an apparatus for treating a liquid that includes: (a) a pump volute or hydrocyclone head having an inlet and a throat having an outlet and a central axis; (b) a tank connected to the second opening of the throat, at least an upper portion of the tank comprises a reflector and the tank has a maximum inner diameter that is larger than an inner diameter of the outlet of the throat; and (c) a wave energy source having a first electrode within the pump volute or hydrocyclone head that is aligned with the central axis, and a second electrode within the tank that is spaced apart and axially aligned with first electrode along the central axis. The liquid is supplied to the inlet of the pump volute or hydrocyclone head, and is irradiated with one or more wave energies (a) produced by a plasma core created by an electrical arc between the first electrode and the second electrode and (b) reflected by the reflector.

Moreover, the parent invention provides an apparatus for treating a liquid that includes: (a) a pump volute or hydrocyclone head having an inlet and a throat having an outlet and a central axis; (b) a tank connected to the second opening of the throat, at least an upper portion of the tank comprises a reflector and the tank has a maximum inner diameter that is larger than an inner diameter of the outlet of the throat; (c) a wave energy source having a first electrode within the pump volute or hydrocyclone head that is aligned with the central axis, and a second electrode within the tank that is spaced apart and axially aligned with first electrode along the central axis; (d) a power supply connected to the first electrode and the second electrode; and (e) a mechanism to strike an electrical arc between the first electrode and the second electrode. The liquid is supplied to the inlet of the pump volute or hydrocyclone head, and is irradiated with one or more wave energies (a) produced by a plasma core created by the electrical arc between the first electrode and the second electrode and (b) reflected by the reflector.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
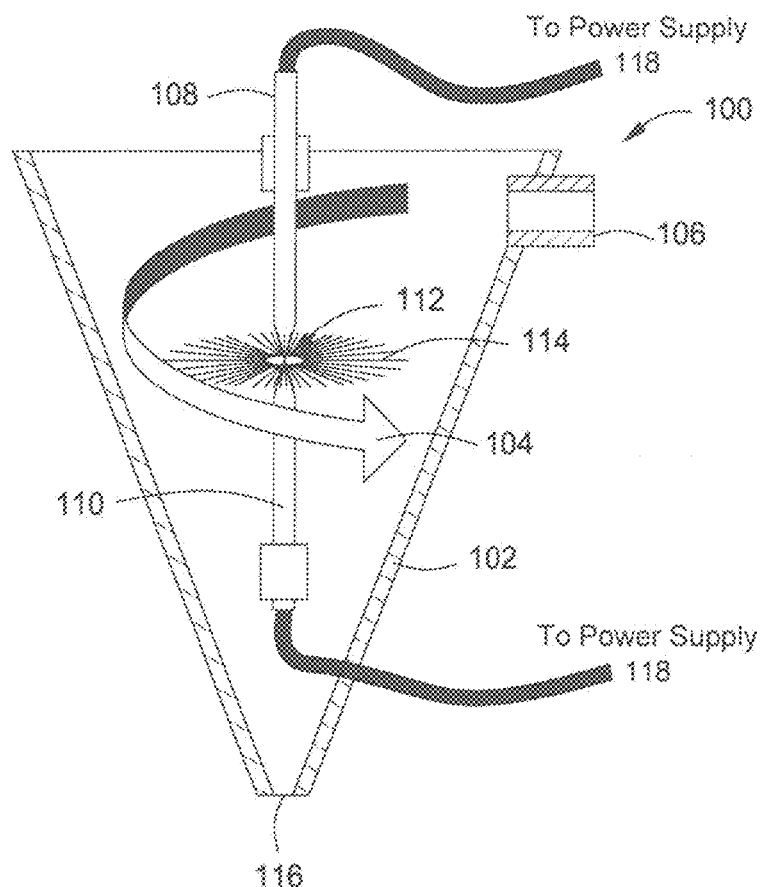
FIG. 1 illustrates an arc whirl device in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to treating water, but it will be understood that the concepts of the present invention are applicable to treating any liquid.

The term "wave energy" is used herein to include radiation as well as wave energies transmitted by various mediums, and embraces electromagnetic waves or radiations; sonic, supersonic, and ultrasonic waves; and neutrons, protons, deuteron, and other corpuscular radiations. The term "electromagnetic waves" includes, e.g., X-ray and gamma-ray, ultraviolet, infra red, and visible light rays, microwave, and both short electric and radio waves.

The present invention provides a system, method and apparatus for treating liquids with wave energy from an electrical arc that: (1) is compact and portable, yet does not use mercury; (2) is energy efficient, rugged, low maintenance and compact; (3) can also remove fine sediment or reduce turbidity in water; (4) can also phase separate material of various densities from that of water, such as oil and grease, wood, leaves, and plastic bottles from water; and/or (5) can reduce organic matter in water. The liquid can be drinking water, wastewater, beverages, juices, milk, emulsions, ballast water, bilge water, cooling tower water, process water, mill water, raw sewage, crude oil, hydrocarbon streams, black liquor or any pumpable liquid. The present invention can operate in remote areas of the world that can deliver various forms of wave energy to the water and contaminants, not simply UV radiation, and would aid in decomposing organics and produce potable water that is needed immediately throughout the world. In addition, the present invention can be operated without line powers and generators by using a wind turbine or photovoltaic cells, which allows for remote treatment of water and wastewater.

The present invention generates a whirlpool or cyclonic flow and one or more wave energies in the "eye" or "hollow gas core" of the whirlpool. The present invention treats the liquids or fluids by first irradiating the fluid with a plasma arc centrally located within the gas core of the whirling fluid, then second forming a thin film with the fluid and irradiating the thin film fluid and third reflecting the wave energy in order to increase the dose of wave energy absorbed by the fluid or matter within the fluid. The present invention can also provide an advanced oxidation/reduction process (AORP) for treating fluids utilizing a semi-conductor catalyst. Likewise, the present invention includes a means for introducing charged nano metals and minerals as well as carbon for treating water. Additionally, the present invention includes a phase separation means.

The present invention, which will be described in detail below, provides superior wave energy delivery to the fluid to be treated, a superior method for stripping and destroying volatiles in-situ and a method for subjecting fluids, contaminants and pathogens to several forms of wave energy simultaneously. In addition, the present invention provides a mechanism for treating matter with several forms of wave energy, such as ultraviolet radiation, vacuum ultraviolet radiation, infrared radiation, visible light radiation, sonic energy, ultrasonic energy, electrolysis or a combination thereof. Additionally, the present invention provides a mechanism for generating an oxidant or free radicals in-situ. Furthermore, the present invention utilizes a unique approach for disinfecting and filtering water within the same system. Hence, by the present invention's novel wave energy method for treating fluids by eliminating the lamp, and using a carbon arc in combination with a whirling fluid. A system can be designed to treat very low flow rates using a wind turbine or photovoltaic cells to recharge DC batteries, while scaling up to treat volumes of water currently unheard of by using very large DC power supplies and graphite rods, commonly found within the foundry industry—carbon arc furnaces.

Accordingly, the present invention treats liquids or fluids with several forms of wave energy at wavelengths, focus, intensity and residence times that is superior to prior methods. The present invention uses the conservation of angular momentum to first form a whirling fluid that increases in velocity, then expands outwardly to form a thin film upside down whirlpool or funnel, generally shaped in the form of an umbrella or parabolic reflector. The present invention also overcomes residence time and absorbance phenomena associated with photochemical reactions.

Prior art wave energy, in particular EMR, devices and methods, are designed for a given flow rate range. Simply put, the photochemical reactor has a known volume, and based upon the volume of the reactor the number of EMR sources which are needed to effect a reaction over a specified time period is calculated and commonly referred to as residence time (RT). Normally the EMR sources are continuous wave sources such as long linear low-pressure mercury arc lamps, medium pressure mercury lamps and short-arc HgXe lamps. However, high intensity flash lamps are being employed for liquids that are somewhat opaque, such as juices. Since these lamps are rated in watts, then the joules/second emitted from the lamps can be multiplied by the RT to specify an effective dose applied to an area (watts/second/area) of the treated fluid.

For example, the amount of radiation necessary to deactivate bacteria is known. Thus, simply by working backwards from this known value, in combination with the average population density of the bacteria, the variable or number of EMR sources and size of the reactor may be easily calculated. However, problems arise when bacteria counts increase from the assumed average value. Either a second reactor must be installed or more lights must be added to the existing reactor.

The Beer-Lambert Law can be applied to clearly show that a long linear lamp placed inside a conduit would be an ineffective photochemical reactor. The Beer-Lambert Law and associated equation is significant to photochemical or wave energy reactor design. Although the following equation is straightforward, it is often misunderstood and incorrectly used.

$$A = \epsilon b c$$

Where A is absorbance (no units);
$\epsilon$ is the molar absorbtivity with units of L/mole/cm;
b is the path length of the sample (or photochemical reactor length); and
c is the concentration of the compounds in the solution with units of moles/liter.

Within this law, absorbance is directly proportional to the other parameters. The law indicates that the fraction of the radiation absorbed by each layer of the fluid is the same. The equation, "$A=\epsilon bc$" tells a photochemical reactor designer that absorbance depends on the total quantity of the absorbing compound in the radiation path through the photochemical reactor. Thus, if a designer refers to percent transmission (% T) an exponential curve can be generated comparing % T to pathlength. However, if absorbance is plotted against concentration, a straight line emerges. Thus, the linear relationship between concentration and absorbance is both simple and straightforward.

However, as omni-directional wave energy travels away from its source in a given vessel, in accordance with "$A=\epsilon bc$", the number of photons near the wall of the vessel has decreased, but the concentration of contaminants within the fluid is equal at any distance from the omni-directional lamp. Thus, if this reactor is designed for bacterial disinfection, the bacteria near the wave energy source receives a greater amount of energy than the bacteria near the wall of the vessel. As a result, bacteria kill is higher near the wave energy source and decreases by the square of the distance from the lamp.

Since this is an omni-directional lamp it follows the inverse square law, which states that the intensity of light observed from a source of constant intrinsic luminosity falls off in direct proportion to the square of the distance from the object. As an example, if 16 W/cm$^2$ is measured at a distance of 1 meter from a source, 4 W/cm$^2$ will be measured at 2 meters. The intensity can be similarly calculated at any other distance. The inverse square law is applicable to variations in intensity without regard to direction from the light source only in cases where the light source approximates a point source. However, the same principle is useful in understanding the decrease in intensity that occurs outward from a linear source, such as an elongate bulb, in a direction normal to the axis of the elongate source.

In the context of treating fluids with wave energy, another significant factor that has a significant effect on treatment efficacy is the distance that a given wave energy particle, such as a UV light photon will travel through a material. For example, UV light with a wavelength of 253.7 nm can penetrate water to a depth of over 24 inches, but a very thin sheet of aluminum foil will block UV light completely. Likewise, turbidity in water will partially block UV light. On the other hand, aluminum can be enhanced to reflect greater than 80% of UV light. Accordingly, all UV light treatment systems are subject to the disadvantages and obstacles related to absorbance, or penetration distance through the fluid being treated. Penetration distance is also referred to as path length. Because of these factors, it can be understood that increasing the reactor volume to increase fluid residence time does not affect or change path length, and does not necessarily improve treatment effectiveness.

With these factors in mind the present invention can be more readily understood and its novelty and significance more readily appreciated. The present invention overcomes the problems of diminishing intensity and of path length by exposing a thin layer of fluid to wave energy in close proximity to the energy source.

Referring now to FIG. 1, an Arc Whirl device 100 in accordance with one embodiment of the present invention is illustrated. A vessel 102 capable of producing vortex flow as shown by arrow 104, such as a funnel or cyclone, is use to produce a thin film of liquid flowing on the vessel wall around a gas core or a plasma core. The shape of the vessel 102 and the position and/or type of inlet 106 is not limited to those shown in FIG. 1. Instead any combination of shapes or orientations can be used as long as the vortex flow 104 is created. The central gas core, which is devoid of the liquid, is created when the liquid, such as water, is introduced into the vessel 102 via inlet 106 to create the vortex flow 104. Carbon arc rods 108 and 110 are located within the central core. A carbon arc 112 is created by extending a filament between the carbon arc rods 108 and 110 to form a dead short when the electrodes 108 and 110 are connected to a power supply 118. Alternatively, the carbon arc 112 can be created by moving carbon arc rods 108 and 100 together to form a dead short when the electrodes 108 and 110 are connected to the power supply 118 and then separating them to "draw" the carbon arc 112. The carbon arc 112 extending between the proximate tips of the carbon rods 108 and 110 produces one or more wave energies 114, such as deep UV light, to treat the liquid. The liquid is discharged from the vessel 102 via an exit or outlet 116.

Graphite rods are manufactured in sizes ranging from welding rod diameters of 0.125 inches to diameters of 6 feet for carbon rods commonly used in electric arc furnaces. Since World War II vintage carbon arc searchlights are widely available, the present invention can easily be constructed from that supply of surplus searchlights. Any DC power source 118 can be used to create a carbon arc from graphite rods. A simple solar powered battery can be used as the DC source 118 for the carbon arc, which enables the use of inexpensive disinfection systems for treating, e.g., drinking water, in remote areas as well as third world countries. The present invention also provides a mechanism for a compact, but extremely powerful, wave energy system for disinfecting high flow rate streams such as ship ballast water and large municipal drinking water and wastewater plant effluent. In contrast to typical UV light systems, the present invention is not limited in size due to lamp construction, nor in performance due to solarization of a quartz lamp envelope. In addition, maximum transfer of wave energy occurs in the present invention, since the present invention uses an open arc. Furthermore, the present invention makes use of all the forms of wave energy produced from the carbon arc and not simply just the UV light irradiated from the plasma or tip of the hot carbon rod.

A vessel 102 that is well suited for creating a vortex for use in the present invention for disinfecting and sterilizing using induced cavitations is disclosed in U.S. Pat. No. 6,019,947 issued to Kucherov on Feb. 1, 2000 and entitled, "Method and Apparatus for Sterilization of a Continuous Liquid Flow,"

which hereby incorporated into the present description in its entirety. The improvement of the present invention over the teaching of the Kucherov '947 patent includes, without limitation, the factor that the carbon arc of the present invention adds at least two additional forms of wave energy for sterilization—UV light and free radicals or electrons.

Figure 2:
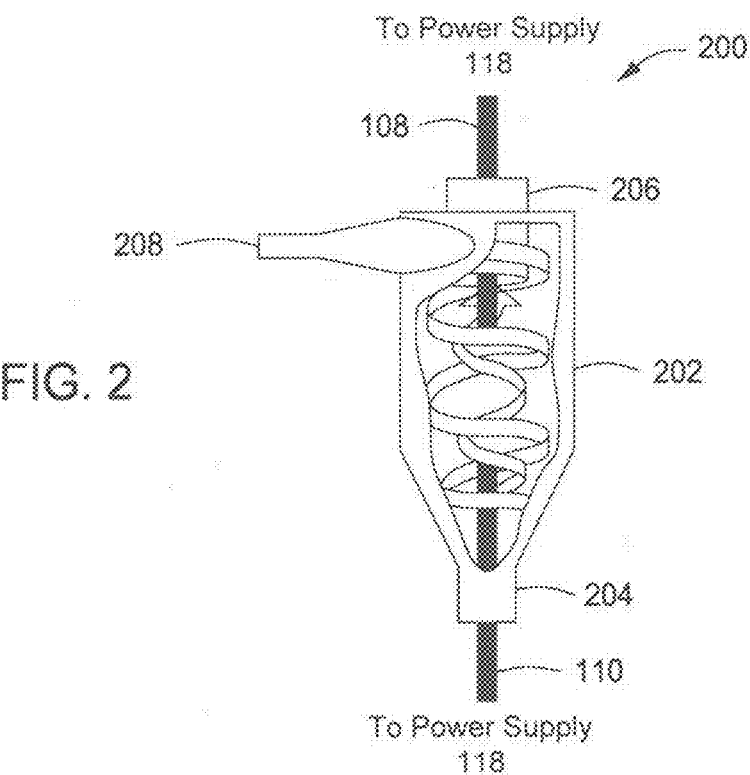
FIG. 2 illustrates an arc whirl cyclone separator in accordance with a second embodiment of the present invention.

Now referring to FIG. 2, an arc whirl cyclone separator 200 in accordance with a second embodiment of the present invention is illustrated. A cyclone separator 202 can easily be modified for the present invention. The carbon rods 108 and 110 are inserted in the underflow 204 and overflow 206 of the cyclone separator 200. The liquid is introduced into the cyclone separator 202 via inlet 208. The carbon arc is formed between the rods 108 and 110 within the core of the cyclone separator 202 when the carbon rods 108 and 110 are connected to power supply 118.

Figure 3:
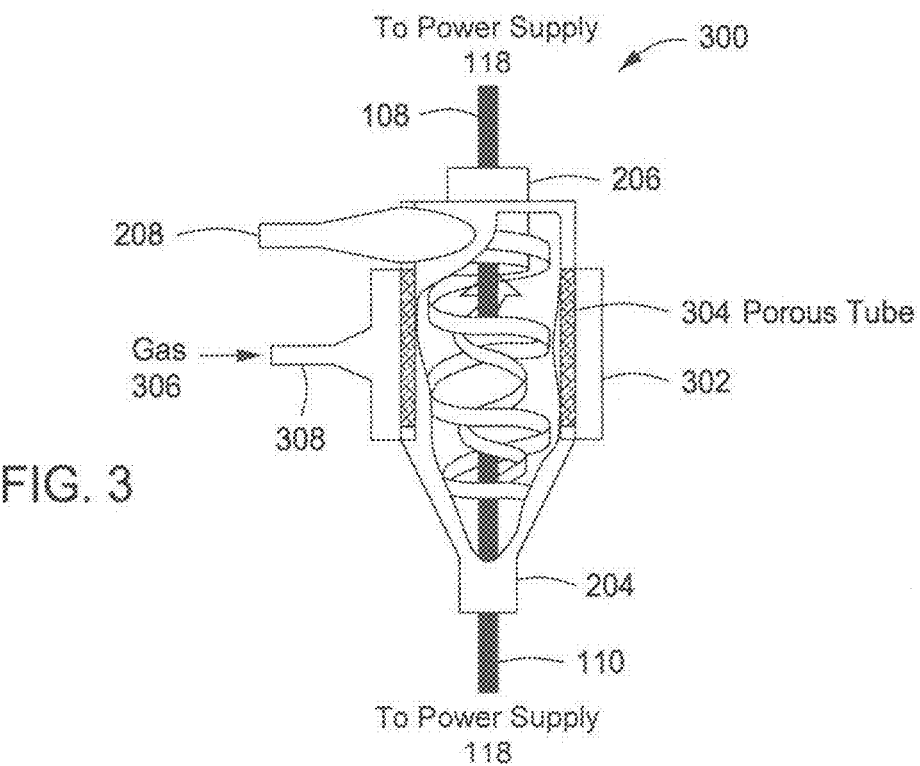
FIG. 3 illustrates an arc whirl gas-sparged hydrocyclone in accordance with a third embodiment of the present invention.

Referring now to FIG. 3, an arc whirl gas-sparged hydrocyclone 300 in accordance with a third embodiment of the present invention is illustrated. A hydrocyclone with a porous wall 304, referred to as an air-sparged hydrocyclone, can be used as the vessel 302 for the present invention. The carbon rods 108 and 110 are inserted in the underflow 204 and overflow 206 of the gas-sparged hydrocyclone 300. The liquid is introduced into the vessel 302 via inlet 208. The carbon arc is formed between the rods 108 and 110 within the core of the vessel 302 when the carbon rods 108 and 110 are connected to power supply 118. Air or gas 306 is introduced into the vessel 302 via gas inlet 308 connected to the porous wall 304. The air/gas sparged hydrocyclone aids in stripping volatiles from the fluid and induce cavitation, in addition to the creation of a thin fluid film. Air-sparged hydrocyclones can strip hydroscopic molecules, such as alcohols, from water. Further, the air boundary layer between the sparging surface and the fluid reduces friction, thus allowing the fluid to achieve and maintain higher velocities at lower pump pressures. This has a highly desirable effect if the fluid achieves a velocity sufficient to cavitate. Cavitation is the formation of bubbles in a liquid, followed by a subsequent collapse of the bubble. Cavitation can be viewed as a form of wave energy, because the cavitation creates sonic waves and sonic energy is a form of wave energy.

Moreover, cavitation can "kill" pathogens, produce chemical reactions and mix the fluid thoroughly. In addition, the thoroughly mixed fluid travels through a gas-sparged hydrocyclone in a corkscrew or vortex path, but as a very thin layer. This thin layer results in a very short penetration distance that must be achieved by the wave energy to achieve effective treatment through the full thickness of liquid. Consequently, the available path length for the wave energy in the treated fluid ceases to be a limitation on treatment effectiveness, and maximum absorption of wave energy will be achieved. It should be understood that wave energy path length and penetration distance are not related to or necessarily affected by the length of the vessel.

When the velocity of the liquid in a thin film air-sparged hydrocyclone is sufficiently to produce cavitation in the liquid, the high level of wave energy from cavitation, in combination with the wave energy generated by the unconfined carbon arc in accordance with the present invention, can dramatically enhance the performance of wave energy based liquid treatment. The addition of the carbon arc system described above to any gas sparger system will also provide dramatic treatment improvements from the expanded range of wave energies generated by the unconfined carbon arc.

Note that the use of a gas-sparged hydrocyclone as the vessel for the present invention is not simply for the cavitation and stripping effects. The REVEX™ MTU, for example, produces a very thin fluid film. In combination with the thin fluid layer, the fluid flows in a spiral path around and along the longitudinal axis of the porous tube component of that apparatus. This produces a dramatic increase in liquid residence time within the reactor in comparison to linear flow through a reactor of the same length, and allows the use of a compact reactor with a much higher effective treatment capacity than is possible with reactors of the prior art.

Figure 4:
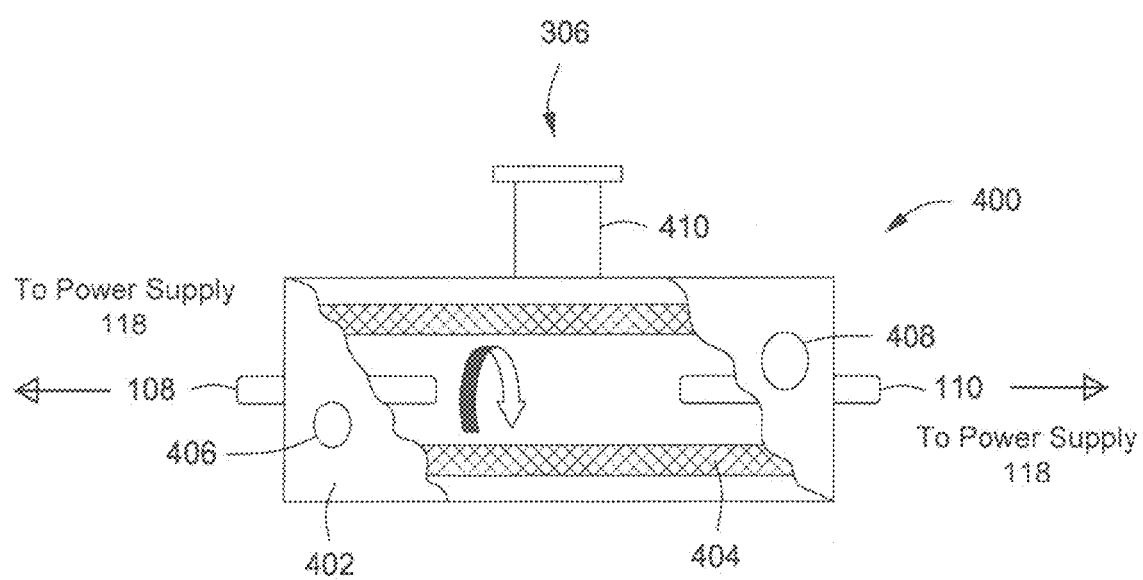
FIG. 4 illustrates an arc whirl gas-sparged pipe with tangential flow in accordance with a fourth embodiment of the present invention.

Now referring to FIG. 4, an arc whirl gas-sparged pipe with tangential flow 400 in accordance with a fourth embodiment of the present invention is illustrated. A pipe 402 with porous wall 404 can also be used for the present invention. The carbon rods 108 and 110 are inserted in each end of the pipe 402. The liquid is introduced into the pipe 402 via inlet 406 and allowed to exit via outlet 408. The carbon arc is formed between the rods 108 and 110 within the core of the vessel 402 when the carbon rods 108 and 110 are connected to power supply 118. Air or gas 306 is introduced into the vessel 402 via gas inlet 410.

Figure 5:
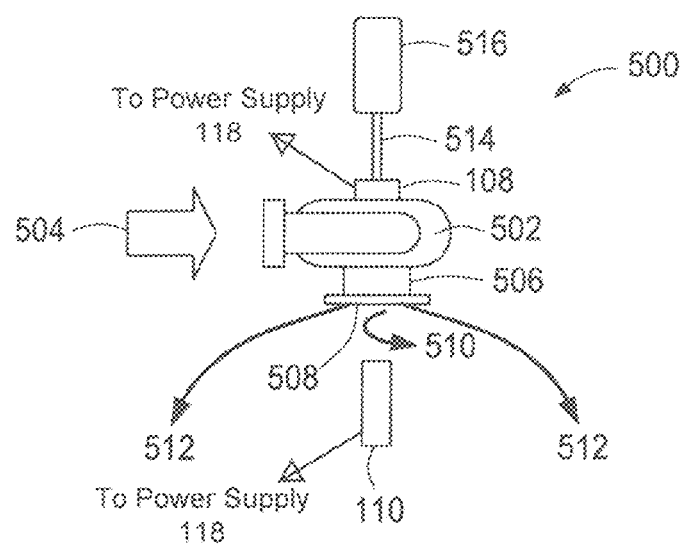
FIG. 5 illustrates an arc whirl volute in accordance with fifth embodiment of the present invention.

Referring now to FIG. 5, an Arc Whirl Volute 500 in accordance with fifth embodiment of the present invention is illustrated. A pump volute or hydrocyclone head 502 is utilized to produce angular momentum. When a liquid, such as water, is introduced into the hydrocyclone as shown by arrow 504 the liquid flows in a circle about a central axis forming a whirlpool or whirl flow and generating angular momentum. Hence, the term whirl herein means or is similar to vortex, swirl, cyclone, tornado, hurricane, typhoon or generally any flow having angular momentum. In applying the method of the present invention, quite simply electrodes such as carbon or graphite rods 108 and 110 are located along the central core or axis of the angular momentum generator—the volute 502. One electrode 108 is placed within the volute 502 while the other 110 is located outside of a throat 506. When referring to a pump, the throat 506 is actually the pump's suction inlet. In this example, the throat 506 is straight, but the throat can be cone shaped (throat 602) as shown in FIG. 6. When in operation water flows into the volute 502 via arrow 504 and forms whirl flow with an air core if open to atmosphere. The whirlpool enters into the throat 506 and the water must increase in velocity due to the conservation of angular momentum. As soon as the whirlpool exits the throat 506 at an exit point 508 the water continues to whirl as shown by arrow 510 but immediately expands outwardly as shown by arrows 512. The whirling water takes on a thin film umbrella or thin film upside down funnel shape with a very large air core. The unique shape or profile of the whirl method of the present invention gives rise to an entirely new method for treating liquids. Since a low pressure gas core is formed along the central axis, then an arc can be struck and maintained within the central gas core and within the umbrella or upside down funnel. In order to strike an arc and convert the gas core to an arc plasma core, one of the electrodes 108 can be connected to a pushrod 514 that is connected to an actuator 516. The actuator 516 moves the electrode 108 until it touches electrode 110. When electrodes 108 and 110 touch, a dead short forms when the electrodes 108 and 110 are connected to a power supply 118. Next, electrode 108 is retracted thus forcing electrons to flow through the gas core and converting the gas core to an ionized gas typically referred to as a plasma. In lieu of moving the electrode 108, the pushrod 514 can move and touch the electrode 110. The pushrod 514 acts as a stinger to pull the arc from one electrode 110 to the other electrode 108.

An inert gas such as argon, helium, nitrogen, xeon or neon may be used in order to reduce oxidation of the electrodes as well as change the EMR spectrum of the plasma. Oxygen may be added to produce ozone and atomic oxygen. Of course any gas can be added and ionized including steam and hydrogen. Once again, the electrodes may be constructed of any electrically conductive material and not just carbon.

Figure 6A:
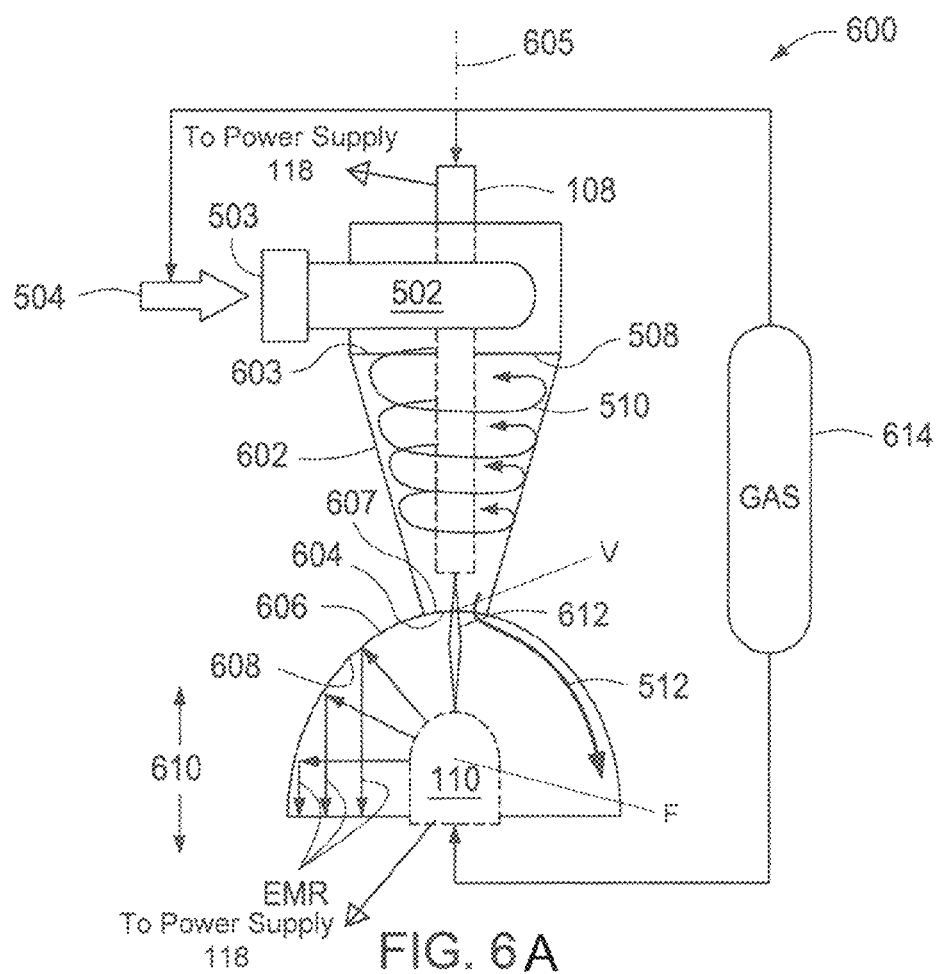
FIGS. 6A & 6B illustrate an arc whirl hydrocyclone reflector in accordance with a sixth embodiment of the present invention.
Figure 6B:
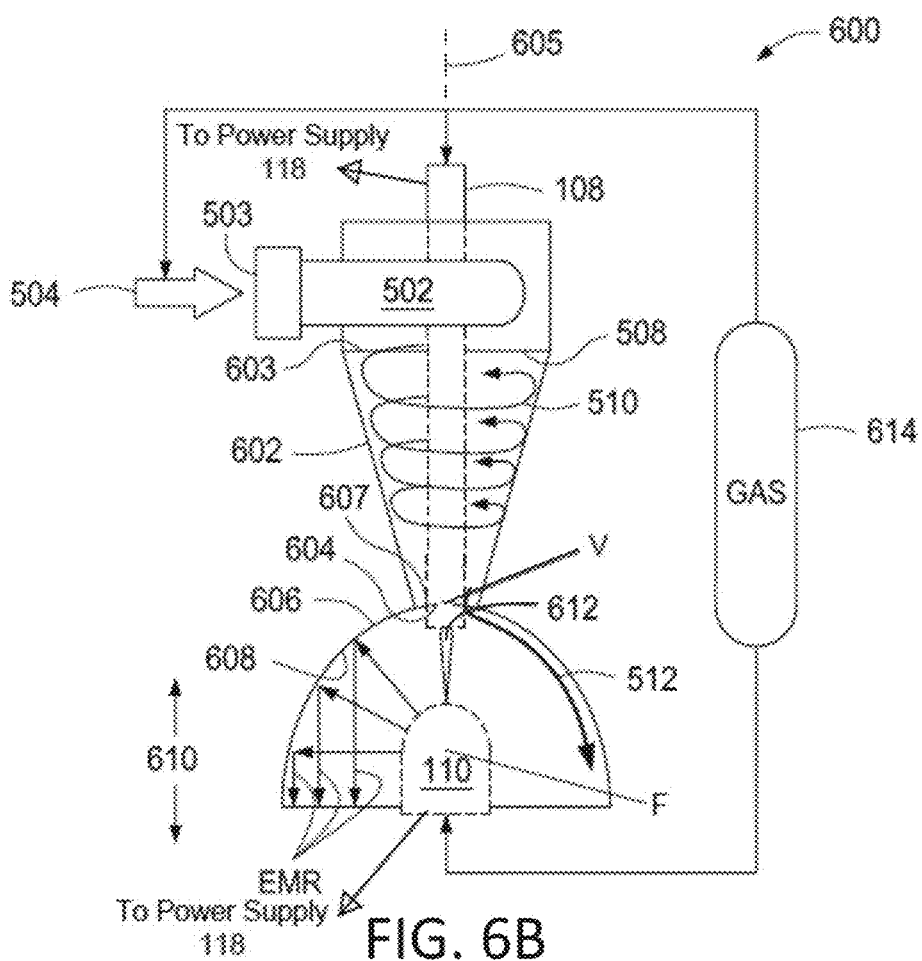

Now referring to FIGS. 6A & 6B, an Arc Whirl Hydrocyclone Reflector 600 in accordance with a sixth embodiment of the present invention is illustrated. The novelty of the present invention lies within the power or wave energy generated by the carbon arc and the plasma 612 in combination with the unique shape of the whirling liquid. The throat 602 can be straight as shown in FIG. 5 (throat 506) or cone shaped, such as a concentric reducer as shown in FIGS. 6A & 6B. When the water expands outwardly 512 at exit point 604 as previously stated the water takes the shape of a parabolic upside down funnel. The shape is almost identical to many common reflectors used throughout the lighting and optics industry.

Now when the water pressure and flow rate are increased prior to entering the arc whirl, the umbrella shape will transition to more of a cone shape rather than an umbrella or parabolic shape. This of course does not affect the present invention. By adding a reflector 606 to the exit 604, electromagnetic radiation (EMR) emitted from the white hot carbon electrode 110 can be reflected to form a parallel beam as shown by EMR arrows. Reflector 606 may have a coating 608 to increase reflectivity or create a desired chemical reaction. Moreover a gas 614 can be introduced to create a desired chemical reaction or reduce/eliminate consumption or oxidation of the electrodes. Either electrode 108 or 110 can be the anode. Typically, the anode produces more EMR than the cathode. Thus, in order to take advantage and maximize the use of wave energy, both electrodes may move in the directions as shown by arrow 610 in order to place the electrodes in the most effective treatment zones for treating a particular liquid, microorganism or contaminant. For example, electrode 108 can be positioned along the central axis 605 in the pump volute or hydrocyclone head 502 (FIG. 5), or to extend into the throat 602 (FIG. 6A), or to extend through the outlet (second opening 604) of the throat 602 into the reflector 606 (FIG. 6B). Similarly, electrode 110 can be positioned at different points along the central axis 605.

More specifically, the Arc Whirl Hydrocyclone Reflector 600 includes a pump volute or hydrocyclone head 502, a throat 602, a parabolic reflector 606, and a wave energy source having a first electrode 108 and a second electrode 110 connected to power supply 118. The pump volute or hydrocyclone head 502 has an inlet 503 and an outlet 508. The throat 602 has a first opening 603, a second opening 604 and a central axis 605. The first opening 603 is connected to the outlet 508 of the pump volute or hydrocyclone head 502. The parabolic reflector 606 has a vertex V, a focus F and an opening 607 at the vertex V. The opening 607 is connected to the second opening 604 of the throat 602 such that the vertex V and focus F are axially aligned with the central axis 605 and the focus F is not located within the throat 602. The first electrode 108 is disposed within the pump volute or hydrocyclone head 502 that extends through the outlet 508 into the first opening 603 of the throat 602 along the central axis 605 of the throat 602 (FIG. 6A) or through the outlet (second opening 604) of the throat 602 into the reflector 606 (FIG. 6B). The second electrode 110 extends into the parabolic reflector 606 proximate to the focus F. The second electrode 110 that is spaced apart and axially aligned with first electrode 108. The liquid 504 enters through the inlet 503 of the pump volute or hydrocyclone head 502 and exits through the opening 607 at the vertex of the parabolic reflector 606.

Figure 7:
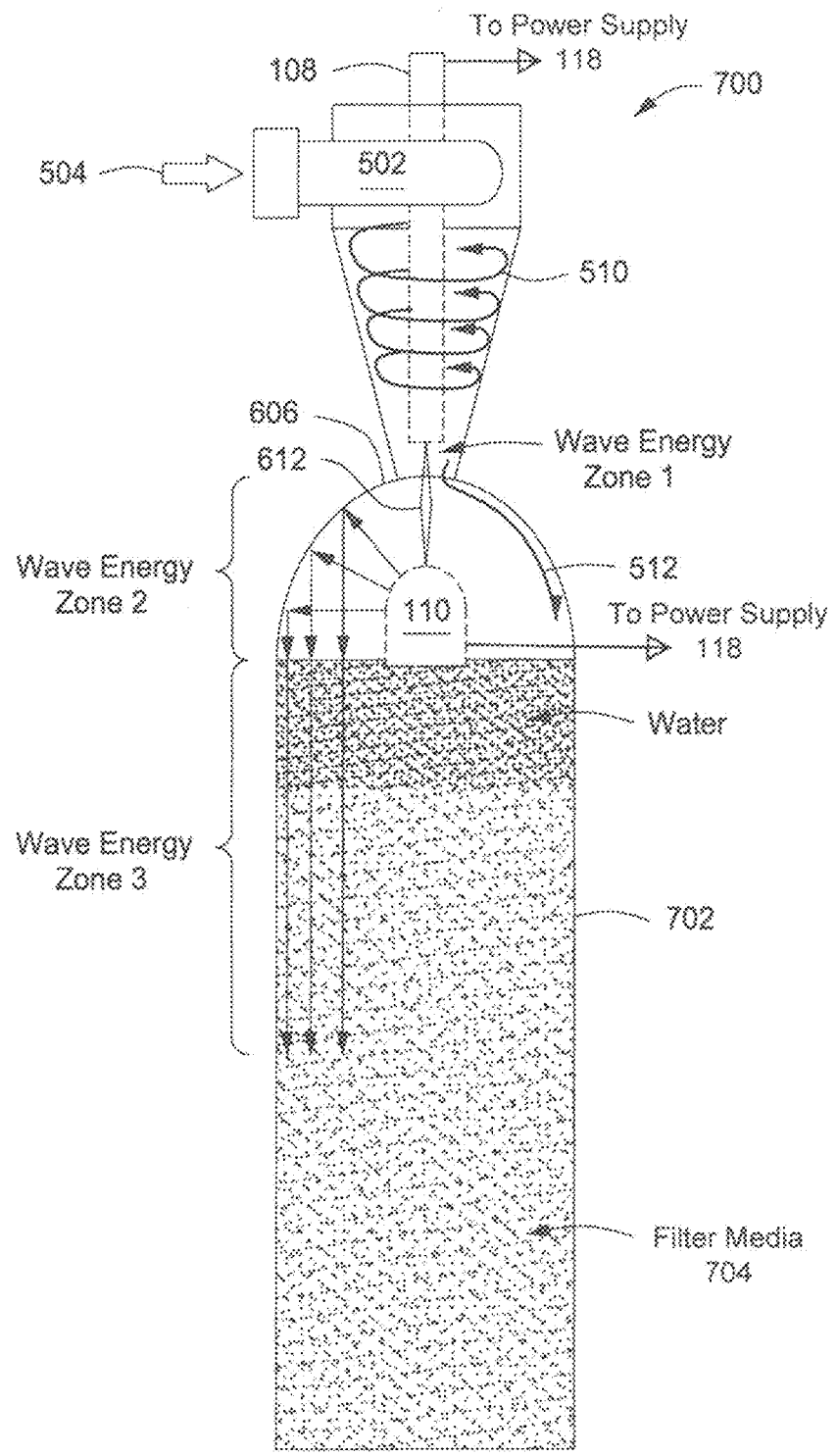
FIG. 7 illustrates an arc whirl hydrocyclone reflector conduit in accordance with a seventh embodiment of the present invention.

Referring now to FIG. 7, an Arc Whirl Hydrocyclone Reflector Conduit 700 in accordance with a seventh embodiment of the present invention is illustrated. The hydrocyclone 502 and reflector 606 are installed on top of a tank 702. The tank 702 has a maximum inner diameter that is larger than an inner diameter of the throat 602 (FIGS. 6A & 6B) or 506 (FIG. 5). The parabolic or elliptical reflector 606 can be utilized to irradiate the water in the tank 702 and increase the residence time or dose. The reflector 606 may include a coating 608 (FIGS. 6A & 6B), such as a UV enhancing material or a semi-conductor catalyst (e.g., $TiO_2$). The electrode 108 can be positioned along the central axis 605 in the pump volute or hydrocyclone head 502 (FIG. 5), or to extend into the throat 602 (FIGS. 6A & 7), or to extend through the outlet (second opening 604) of the throat 602 into the reflector 606 (FIG. 6B). Similarly, electrode 110 can be positioned at different points along the central axis 605. This embodiment of the present invention 700 gives rise to several Wave Energy Zones. A Wave Energy Zone 1 is formed by the plasma 612. Plasma emits both EMR and sonic energy. The EMR emitted from the plasma 612 is based upon the gas as well as any liquids or solids that may become trapped and ionized by the plasma. Likewise, plasmas contain ionized gases. The ionized gases which consist of electrons and cations may enter into the water and aid in treating the water. Thus, due to the water being in close proximity to the plasma 612 the water may be treated with various forms of wave energy. In addition, if oxygen is present both atomic oxygen and ozone may be formed. Both are highly reactive oxidants which can be used for treating water for disinfection as well as oxidation of organics, metals and minerals.

A carbon arc produces vacuum UV (VUV). Consequently, as previously stated VUV photons have a sufficient amount of energy to cleave water molecules and form highly reactive radicals such as hydroxyl radicals. In addition, VUV photons have a sufficient amount of energy to cleave carbon-carbon bonds in hydrocarbons. A carbon arc also produces copious amounts of both near and far infrared (IR) radiation. This will further enhance disinfection as well as well as aiding in treating organic compounds because organics absorb IR and vibrate electrons. Not being bound by theory, in addition to UV light and sonic energy the IR may catalyst the destruction of organics and pathogens within the water.

Next, the water enters a second Wave Energy Zone 2. Once again the water or liquid is treated by several forms of wave energy. First, the thin film umbrella or cone shaped water funnel must pass thru the EMR in Wave Energy Zone 2 then again thru the EMR reflected by reflector 606 in Wave Energy Zone 3. Now, what is truly unique and unobvious is that if the position of electrode 110 is within the water, and the water is conductive, then the water will be treated by another form of wave energy—electrolysis. This gives rise to treating heavy metals such as selium found in uranium mills wastewater effluent. The metals may be plated unto the electrode 110 if operated as the cathode.

The tank 702 may consist simply of a very long pipe. The benefits of irradiating down the longitudinal axis of a pipe are discussed in U.S. Pat. No. 5,832,361 which is incorporated by reference in its entirety. Likewise, the tank or pipe 702 forms a Wave Energy Zone 3. It is in this zone that residence time can be dramatically increased by simply increasing the diameter of the tank 702 with an appropriate reflector or increasing the length or depth of the conduit 702.

In addition, one or more filter media 704 may be added to the tank 702. This allows for a stand alone water treatment system that disinfects and removes turbidity which can be used in remote areas of the world. A prototype similar to FIG. 7 was constructed using 5 twelve volt DC batteries operated in series. A one inch arc was maintained using 60 volts and 20 amps to produce about a one kW UV radiation system which completely illuminated the plastic tank 702. The batteries were recharged with a multi-charger designed to charge batteries in series. Of course it will be understood that the batteries could be recharged with a green energy source such as a wind turbine, photovoltaic cell or hydroturbine. Also, the present invention gives rise to a highly mobile and portable emergency response water treatment system for the military, municipalities and emergency responders. The arc whirl can be attached to the battery cell of any of the new hybrid vehicles.

As illustrated in FIGS. 5 and 6 any hydrocyclone 502 can easily be modified for the present invention by means of the following method. By attaching a reflector 606 to the underflow of the hydrocyclone 502 this allows for a novel method for treating water with wave energy. As previously explained EMR can be reflected by various means known in the art. However, the apex valve of the hydrocyclone must be removed in order to form an umbrella shape. In addition, the insertion of the carbon rod 108 will substantially plug the overflow. The reason for removing the apex valve is part of the novel method for forming an umbrella shaped upside down water funnel.

While tank testing a hydrocyclone, the apex valve was removed from the underflow of a standard hydrocyclone. The hydrocyclone overflow discharge valve was shut for the test. When water was flowed through the hydrocyclone, upon exiting through the bottom or underflow of the hydrocyclone, the water fanned out and formed a very thin umbrella shape and maintained an air core along the entire central axis of the hydrocyclone. This was completely unexpected because prior to this test a straight piece of tubing with the same diameter of the bottom of the cone was tested and resulted in a twisted rope discharge.

What is not obvious and completely unexpected is a unique method and apparatus for treating small volumes as well as extremely large volumes of liquids. By introducing an inert gas, such as argon, into the system a gas bubble core will be formed and maintained within the hydrocyclone and reflector. Since the argon is less dense then water it will remain in the upper section of the system even when the system is not in operation. When in operation, the argon will seek the center and form a gas core. When an arc is struck between the electrodes 108 and 110 the argon will ionize and form the whirling plasma 612 core. There are several primary reasons for using argon. First, argon is inert and does not affect or react with water. Second, the argon shields the carbon electrodes thus increasing the life expectancy of the electrodes. Also, argon is easy to ionize and is an ideal plasma gas.

Figure 8:
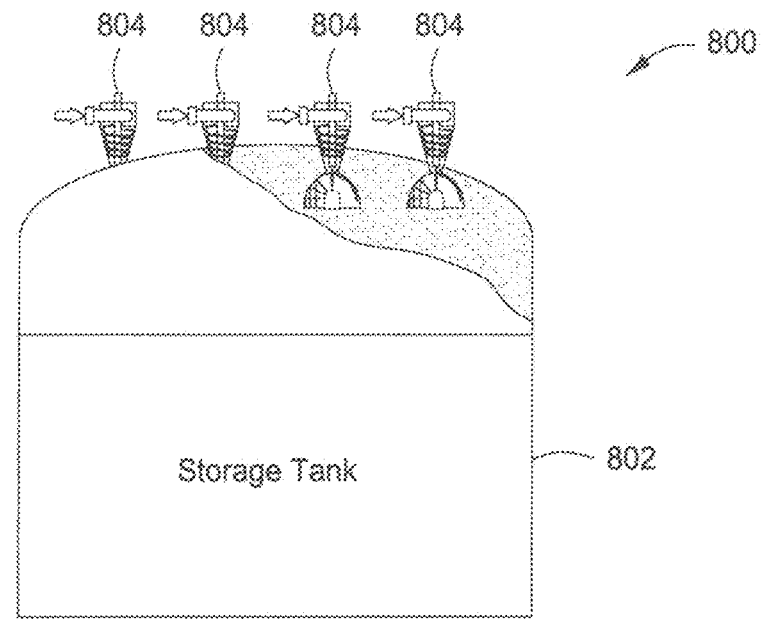
FIG. 8 illustrates multiple arc whirls in tank in accordance with an eighth embodiment of the present invention.

Now referring to FIG. 8, Multiple Arc Whirls in Tank 800 in accordance with an eighth embodiment of the present invention is illustrated. There is virtually no limit to the size of tank 802 the arc whirl can be adapted to in addition to the flow rate. For example, 5 megawatt DC power supplies are available from HDR Ametek. Likewise, graphite electrodes are available in sizes up to 6 feet in diameter. Thus, as shown in FIG. 8 extremely large tanks can be treated with multiple arc whirls 804.

Figure 9:
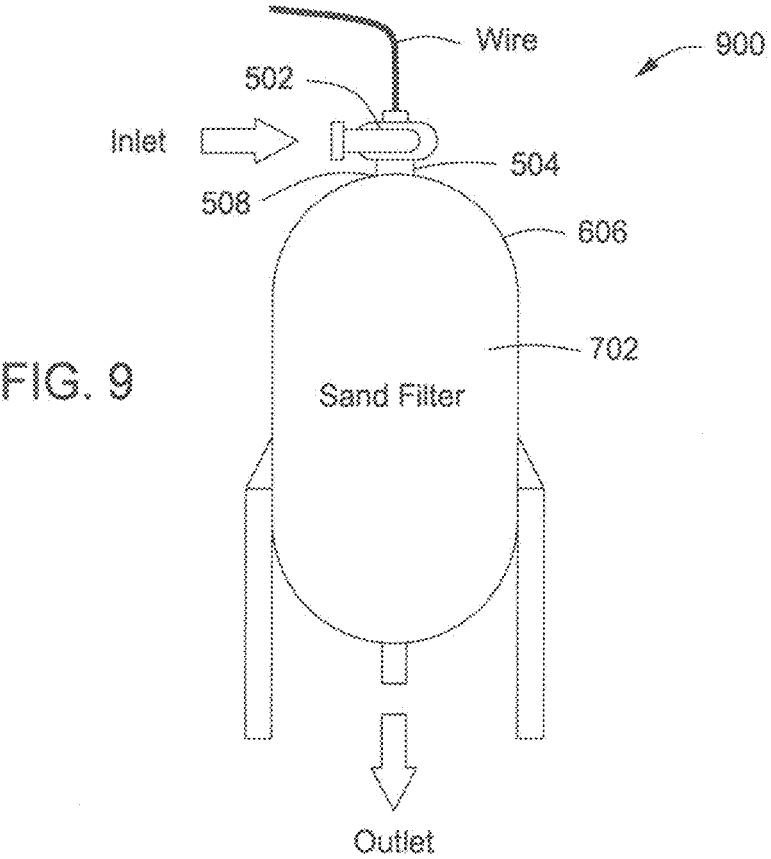
FIG. 9 illustrates an arc whirl with sand filter in accordance with a ninth embodiment of the present invention.

Referring now to FIG. 9, an Arc Whirl with Sand Filter 900 in accordance with a ninth embodiment of the present invention is illustrated. This embodiment can be a retrofit of current sand filters to once again produce a stand alone liquid treatment system. Thus, this rapid retrofit does not require any tank modifications. In addition, the arc whirl sand filter retrofit is quite inexpensive when compared to traditional UV radiation systems.

For example, the total costs for constructing the one kW arc whirl was about $3,000 US. The least expensive one kW UV radiation system on the market today retails for about $26,000. It consists of 26 lamps in a vessel. Thus, from both a capital expense cost as well as operating costs the present invention's arc whirl is far superior. Simply put, in remote areas of the world where sunshine or wind is available, the electrical operating costs can be reduced to nothing. Likewise, the size and weight of the one kW system as well as the current 100 KW model can fit into the trunk of a small car.

A 4 inch 100 kW ArcWhirl was constructed and tested with paint booth water at an automobile plant. The paint booth water was black, opaque, had an extremely obnoxious odor and had an extremely high bacteria count. The paint booth water was treated with the ArcWhirl in a first and second pass. The paint booth water changed colors to a transparent yellow tint and the water was odor free. Lab tests revealed a 99.99% bacteria kill.

Figure 10:
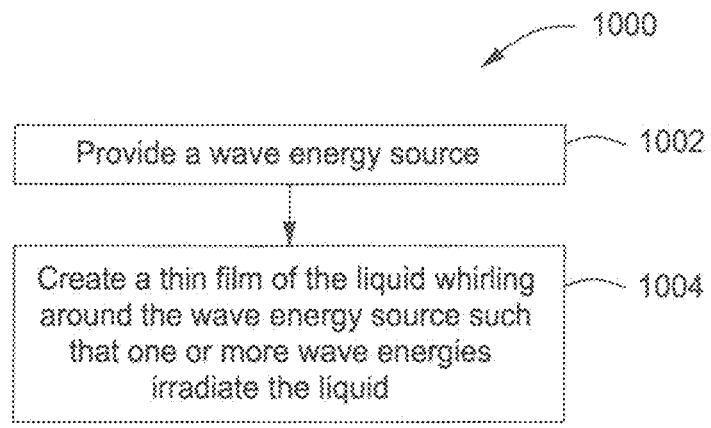
FIG. 10 is a flow chart of a method of treating a liquid in accordance with the present invention.

Now referring to FIG. 10, a flow chart of a method 1000 of treating a liquid in accordance with the present invention is shown. A wave energy source is provided in block 1002 and a thin film of the liquid whirling around the wave energy source is created such that one or more wave energies irradiate the liquid in block 1004. The one or more wave energies may include an ultraviolet radiation, a vacuum ultraviolet radiation, an infrared radiation, a visible light radiation, a sonic energy, an ultrasonic energy, an electrolysis or a combination thereof.

Figure 11:
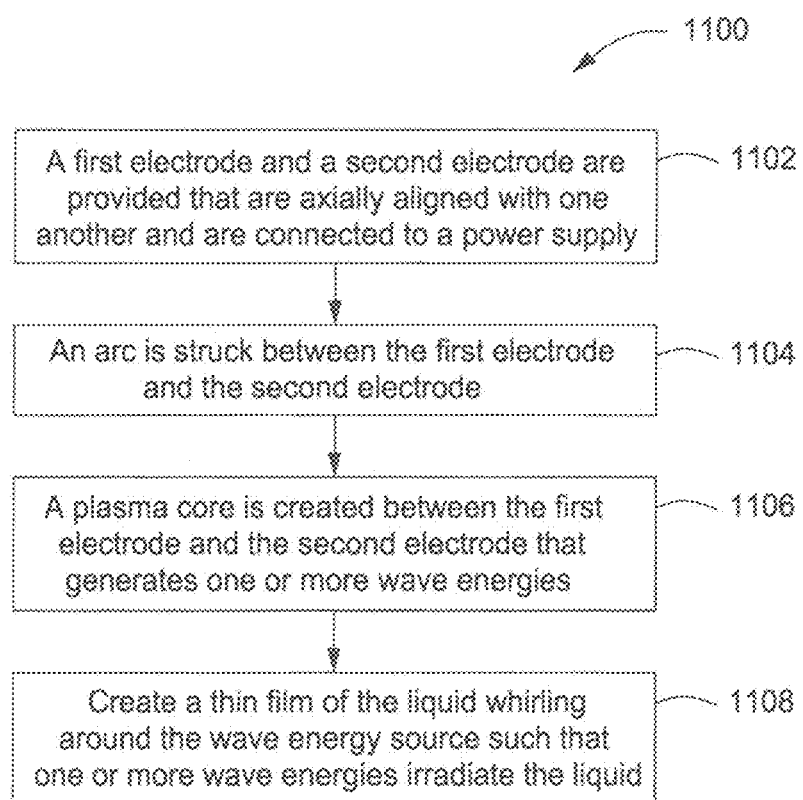
FIG. 11 is a flow chart of another method of treating a liquid in accordance with the present invention.

Referring now to FIG. 11, a flow chart of another method 1100 of treating a liquid in accordance with the present invention is shown. A first electrode and a second electrode are provided that are axially aligned with one another and connected to a power supply in block 1102. An arc is struck between the first electrode and the second electrode in block 1104. A plasma core is created between the first electrode and the second electrode that generates one or more wave energies in block 1106 and a thin film of the liquid whirling around the wave energy source is created such that one or more wave energies irradiate the liquid in block 1108.

The following non-limiting examples of treatment applications in which the present invention may be used are provided to demonstrate the range of utility of the invention as well as the novelty of the inventive concept. These examples also illustrate the extremely urgent need for such an invention in the context of health and environmental safety issues.

Mycobacteria in Metal Working Fluids

Environmental opportunistic mycobacteria, have been implicated in outbreaks of a variety of respiratory problems in a wide variety of settings. One common feature of the outbreaks has been exposure to aerosols. Aerosols are generated from metalworking fluids during machining and grinding operations as well as from other sources such as indoor swimming pools, hot tubs, and water-damaged buildings. In the industrial setting, an estimated 1.2 million workers in the United States are exposed to aerosols generated by metal grinding, and the financial and social impacts of respiratory problems experienced by these workers are substantial. Mycobacteria are readily aerosolized and are resistant to disinfection. In the vast majority of outbreaks of respiratory problems attributed to aerosolized mycobacteria, the water sources of the aerosols had been disinfected. In fact, it is believed that conventional disinfection may select for the predominance and growth of mycobacteria.

The present invention provides the ability to subject fluids such as metalworking fluids to a plurality of wave energy sources, and accordingly shows great promise for effective elimination and control of mycobacteria and other biological contaminants in those fluids. Though mycobacteria can survive chemical disinfection, it is believed that the bacterial will not survive exposure to the combination of UV radiation and free electrons from the carbon arc of the present invention, especially with the further combination of sonic wave energy from cavitation effects. Elimination or reduction of respiratory problems in the work place associated with metal working fluids will have significant financial benefits in affected industries, as well as significant social benefits from the reduction of those health problems.

Poultry Chiller Water

Statistically, each person in the United States consumes 44 kg (96 lb) of poultry meat annually. Poultry accounts for about 36% of meat consumption, second only to beef in the American diet. The wholesomeness of poultry products has a profound impact on public safety and health. The U.S. poultry industry produced 20 billion pounds of chicken and 6 billion pounds of turkey each year. Almost all poultry products are produced in "ready-to-cook" forms from automated plants of multimillion bird capacity. In these plants, birds are slaughtered, defeathered, eviscerated, rinsed, chilled, and packed. Chilling carcasses rapidly to below 40 F is crucial for minimizing microbial growth and preserving carcass quality. It is accomplished by immersing rinsed carcasses in icy water in one, two, or three long tanks, the chillers. Many processors use chlorine to control microbial populations in poultry chiller water (PCW). Presently, chlorine and its hydration products, hypochlorous acid and hypochlorite, are the only disinfectants permitted by the regulatory agencies for use in PCW (U.S. Department of Agriculture, 1993).

Poultry chiller water is known for its high content of organic matter. Chlorination of PCW results in the formation of trihalomethanes, primarily chloroform, and other mutagenic compounds that have yet to be identified. Although the health impact of these potentially deleterious compounds has not been established, providing alternative methods for disinfecting PCW is highly desirable. Further, the recycling of chiller water may offer a way to prevent environmental pollution while helping to conserve valuable water resources.

It is believed that treatment of PCW with the high intensity UV radiation and free electrons generated by the carbon arc of the present invention, especially when the PCW is controlled to be exposed to those wave energies in a thin film in close proximity to the energy source will overcome the prior art disadvantages of intensity and path length and result in safe and effective disinfection of the PCW. The treatment effectiveness can be enhanced within the scope of the present invention by further combining the sonic wave energy associated with cavitation with the carbon arc wave energies by conducting the treatment in, e.g., the REVEX™ MTU apparatus.

Marine Ballast Water

Invasive aquatic species are one of the four greatest threats to the world's oceans, and can cause extremely severe environmental, economic and public health impacts. The introduction of invasive marine species into new environments by ships' ballast water has been identified as one of the four greatest threats to the world's oceans. Shipping moves over 80% of the world's commodities and transfers approximately 3 to 5 billion tons of ballast water internationally each year. A similar volume may also be transferred domestically within countries and regions each year. Ballast water is absolutely essential to the safe and efficient operation of modern shipping, providing balance and stability to un-laden ships. However, it may also pose a serious ecological, economic and health threat.

Reballasting at sea, as recommended by the IMO guidelines, currently provides the best-available measure to reduce the risk of transfer of harmful aquatic organisms, but is subject to serious ship-safety limits. Even when it can be fully implemented, this technique is less than 100% effective in removing organisms from ballast water. Some parties even suggest that reballasting at sea may itself contribute to the wider dispersal of harmful species, and that island states located 'down-stream' of mid-ocean reballasting areas may be at particular risk from this practice. It is therefore extremely important that alternative, effective ballast water management and/or treatment methods are developed as soon as possible, to replace reballasting at sea.

MTBE in Drinking Water

MTBE, a gasoline additive, has contaminated many aquifers. Due to its high solubility it is extremely difficult to remove from water. However, when a carbon arc is incorporated in the central core of, preferably, the REVEX™ MTU, it is believed that the combination of cavitation energy with UV light energy and free electrons from the carbon arc will have a synergistic effect for the removal and/or decomposition of MTBE without the necessity of removing it from the water. Without being bound by theory, it is believed that oxidants such as free radicals, hydrogen peroxide and ozone will form from cavitation and from the contact of air with the carbon arc plasma. As a result, the MTBE will be oxidized to carbon dioxide and water.

Pathogens Such as *Anthrax* and *Legionella* in Drinking Water and/or Air

The synergistic affect of cavitation, UV light, and in situ generated oxidants produced by the apparatus of the present invention will have a deleterious affect on pathogens such as *anthrax* and *legionella*. The present invention can be used in a dual approach by scrubbing air to remove pathogens and then recirculating the liquid for a pathogen kill.

Paint Booth VOCs

Typically, a downdraft waterfall scrubber is used to scrub VOCs from air exiting from a paint point. As a result, the water is contaminated with VOCs. Without being bound by theory it is believed that the use of, preferably, the REVEX™ MTU in the present invention will achieve a transfer of the VOCs from the water into the carbon arc core. The VOCs within the core will be thermally oxidized. This illustrates that the present invention can be utilized as a thermal oxidizer.

Spent Caustic

Spent caustic solutions generated from refineries and petrochemical facilities are usually considered a hazardous waste due to the presence of benzene. It is believed that the present invention, utilizing, preferably, Revex™ MTU apparatus, can clean the spent caustic by stripping the benzene from the caustic solution and subsequently decomposing the benzene within the apparatus with the carbon arc plasma.

COD-Chemical Oxygen Demand

Not being bound by theory it is believed that the carbon arc/gas-sparged hydrocyclone system can reduce COD in industrial wastewater. To the extent that the COD is not completely oxidized to carbon dioxide and water, it is believed that the present invention will convert COD into organic matter that can be decomposed in a biological wastewater treatment facility.

The foregoing description of the apparatus and methods of the invention in preferred and alternative embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

What is claimed is:

1. An apparatus for treating a liquid comprising:
a pump volute or hydrocyclone head having an inlet and a throat having an outlet and a central axis;
a tank connected to the outlet of the throat, the tank has a maximum inner diameter that is larger than an inner diameter of the outlet of the throat;
a wave energy source comprising a first electrode within the pump volute or hydrocyclone head that is aligned with the central axis, and a second electrode within the tank that is spaced apart and axially aligned with first electrode along the central axis; and
the liquid is supplied to the inlet of the pump volute or hydrocyclone head, and is irradiated with one or more wave energies produced by the wave energy source.

2. The apparatus as recited in claim 1, further comprising a gas source to provide a central core of gas around the wave energy source.

3. The apparatus as recited in claim 2, the gas comprises oxygen, hydrogen, an inert gas or a combination thereof.

4. The apparatus as recited in claim 2, the gas reduces oxidation of the wave energy source, changes a spectrum of one or more of the wave energies or a combination thereof.

5. The apparatus as recited in claim 1, the one or more wave energies comprise an ultraviolet radiation, a vacuum ultraviolet radiation, an infrared radiation, a visible light radiation, a sonic energy, an ultrasonic energy, an electrolysis or a combination thereof.

6. The apparatus as recited in claim 1, at least an upper portion of the tank comprises a reflector that reflects the one or more wave energies to further irradiate the liquid.

7. The apparatus as recited in claim 6, the reflector is coated with a catalyst.

8. The apparatus as recited in claim 1, the tank includes one or more filter media.

9. The apparatus as recited in claim 1, the liquid is irradiated by a plasma core created by an electrical arc between the first electrode and the second electrode.

10. The apparatus as recited in claim 9, the plasma core provides at least two zones of wave energy.

11. The apparatus as recited in claim 1, the first and second electrodes comprise carbon, an electrically conductive material or a combination thereof.

12. The apparatus as recited in claim 1, the throat is straight or cone shaped.

13. The apparatus as recited in claim 1, the liquid fans out in a parabolic shape or a cone shape as the liquid exits the throat.

14. The apparatus as recited in claim 1, further comprising a power supply connected to the first electrode and the second electrode.

15. The apparatus as recited in claim 14, the power supply comprises one or more batteries.

16. The apparatus as recited in claim 15, the one or more batteries are rechargeable by a wind turbine, a photovoltaic cell or a hydroturbine.

17. The apparatus as recited in claim 1, further comprising a mechanism to strike an arc between the first electrode and the second electrode.

18. The apparatus as recited in claim 17, the mechanism comprises an actuator to move the first electrode into contact with the second electrode, or a pushrod to contact the second electrode.

19. The apparatus as recited in claim 17, the mechanism further positions the first electrode at different points along the central axis.

20. The apparatus as recited in claim 1, the first electrode is positioned in the pump volute or hydrocyclone head.

21. The apparatus as recited in claim 1, the electrode extends into the throat.

22. The apparatus as recited in claim 1, the first electrode extends into the tank.

23. The apparatus as recited in claim 1, the liquid comprises water, drinking water, wastewater, beverages, juices, milk, emulsions, ballast water, bilge water, cooling tower water, process water, poultry chiller water, mill water, paint booth water, metal working fluid, raw sewage, crude oil, hydrocarbon streams, black liquor, or spent caustic solution.

24. An apparatus for treating a liquid comprising:
a pump volute or hydrocyclone head having an inlet and a throat having an outlet and a central axis;
a tank connected to the outlet of the throat, at least an upper portion of the tank comprises a reflector and the tank has a maximum inner diameter that is larger than an inner diameter of the outlet of the throat;
a wave energy source comprising a first electrode within the pump volute or hydrocyclone head that is aligned with the central axis, and a second electrode within the tank that is spaced apart and axially aligned with first electrode along the central axis; and
the liquid is supplied to the inlet of the pump volute or hydrocyclone head, and is irradiated with one or more wave energies (a) produced by a plasma core created by an electrical arc between the first electrode and the second electrode and (b) reflected by the reflector.

25. The apparatus as recited in claim 24, further comprising a gas source to provide a central core of gas around the wave energy source.

26. The apparatus as recited in claim 25, the gas comprises oxygen, hydrogen, an inert gas or a combination thereof.

27. The apparatus as recited in claim 25, the gas reduces oxidation of the wave energy source, changes a spectrum of one or more of the wave energies or a combination thereof.

28. The apparatus as recited in claim 24, the one or more wave energies comprise an ultraviolet radiation, a vacuum ultraviolet radiation, an infrared radiation, a visible light radiation, a sonic energy, an ultrasonic energy, an electrolysis or a combination thereof.

29. The apparatus as recited in claim 24, the reflector is coated with a catalyst.

30. The apparatus as recited in claim 24, the tank includes one or more filter media.

31. The apparatus as recited in claim 24, the first and second electrodes comprise carbon, an electrically conductive material or a combination thereof.

32. The apparatus as recited in claim 24, the throat is straight or cone shaped.

33. The apparatus as recited in claim 24, the liquid fans out in a parabolic shape or a cone shape as the liquid exits the throat.

34. The apparatus as recited in claim 24, further comprising a power supply connected to the first electrode and the second electrode.

35. The apparatus as recited in claim 34, the power supply comprises one or more batteries.

36. The apparatus as recited in claim 35, the one or more batteries are rechargeable by a wind turbine, a photovoltaic cell or a hydroturbine.

37. The apparatus as recited in claim 24, further comprising a mechanism to strike an arc between the first electrode and the second electrode.

38. The apparatus as recited in claim 37, the mechanism comprises an actuator to move the first electrode into contact with the second electrode, or a pushrod to contact the second electrode.

39. The apparatus as recited in claim 37, the mechanism further positions the first electrode at different points along the central axis.

40. The apparatus as recited in claim 24, the first electrode is positioned in the pump volute or hydrocyclone head.

41. The apparatus as recited in claim 24, the electrode extends into the throat.

42. The apparatus as recited in claim 24, the first electrode extends into the tank.

43. The apparatus as recited in claim 24, the liquid comprises water, drinking water, wastewater, beverages, juices, milk, emulsions, ballast water, bilge water, cooling tower water, process water, poultry chiller water, mill water, paint booth water, metal working fluid, raw sewage, crude oil, hydrocarbon streams, black liquor, or spent caustic solution.

44. An apparatus for treating a liquid comprising:
a pump volute or hydrocyclone head having an inlet and a throat having an outlet and a central axis;
a tank connected to the outlet of the throat, at least an upper portion of the tank comprises a reflector and the tank has a maximum inner diameter that is larger than an inner diameter of the outlet of the throat;
a wave energy source comprising a first electrode within the pump volute or hydrocyclone head that is aligned with the central axis, and a second electrode within the tank that is spaced apart and axially aligned with first electrode along the central axis;
a power supply connected to the first electrode and the second electrode;
a mechanism to strike an electrical arc between the first electrode and the second electrode; and
the liquid is supplied to the inlet of the pump volute or hydrocyclone head, and is irradiated with one or more wave energies (a) produced by a plasma core created by the electrical arc between the first electrode and the second electrode and (b) reflected by the reflector.

45. The apparatus as recited in claim 44, further comprising a gas source to provide a central core of gas around the wave energy source.

46. The apparatus as recited in claim 45, the gas comprises oxygen, hydrogen, an inert gas or a combination thereof.

47. The apparatus as recited in claim 45, the gas reduces oxidation of the wave energy source, changes a spectrum of one or more of the wave energies or a combination thereof.

48. The apparatus as recited in claim 47, the one or more wave energies comprise an ultraviolet radiation, a vacuum ultraviolet radiation, an infrared radiation, a visible light radiation, a sonic energy, an ultrasonic energy, an electrolysis or a combination thereof.

49. The apparatus as recited in claim 44, the reflector is coated with a catalyst.

50. The apparatus as recited in claim 44, the tank includes one or more filter media.

51. The apparatus as recited in claim 44, the first and second electrodes comprise carbon, an electrically conductive material or a combination thereof.

52. The apparatus as recited in claim 44, the throat is straight or cone shaped.

53. The apparatus as recited in claim 44, the liquid fans out in a parabolic shape or a cone shape as the liquid exits the throat.

54. The apparatus as recited in claim 44, the power supply comprises one or more batteries.

55. The apparatus as recited in claim 54, the one or more batteries are rechargeable by a wind turbine, a photovoltaic cell or a hydroturbine.

56. The apparatus as recited in claim 44, the mechanism comprises an actuator to move the first electrode into contact with the second electrode, or a pushrod to contact the second electrode.

57. The apparatus as recited in claim 44, the mechanism further positions the first electrode at different points along the central axis.

58. The apparatus as recited in claim 44, the first electrode is positioned in the pump volute or hydrocyclone head.

59. The apparatus as recited in claim 44, the electrode extends into the throat.

60. The apparatus as recited in claim 44, the first electrode extends into the tank.

61. The apparatus as recited in claim 44, the liquid comprises water, drinking water, wastewater, beverages, juices, milk, emulsions, ballast water, bilge water, cooling tower water, process water, poultry chiller water, mill water, paint booth water, metal working fluid, raw sewage, crude oil, hydrocarbon streams, black liquor, or spent caustic solution.

* * * * *